(12) United States Patent
Wells et al.

(10) Patent No.: US 11,572,454 B2
(45) Date of Patent: Feb. 7, 2023

(54) FLAME RESISTANT MATERIAL AND RESULTANT PRODUCTS

(71) Applicants: Michael Owen Wells, Grand Junction, CO (US); Emily Faith Robbins, Grand Junction, CO (US)

(72) Inventors: Michael Owen Wells, Grand Junction, CO (US); Emily Faith Robbins, Grand Junction, CO (US)

(73) Assignee: Architectural Solutions IP, LLC, Grand Junction, CO (US)

( * ) Notice: Subject to any disclaimer, the term of this patent is extended or adjusted under 35 U.S.C. 154(b) by 8 days.

(21) Appl. No.: 15/788,497

(22) Filed: Oct. 19, 2017

(65) Prior Publication Data

US 2018/0223079 A1    Aug. 9, 2018

Related U.S. Application Data

(60) Provisional application No. 62/456,516, filed on Feb. 8, 2017.

(51) Int. Cl.
| | |
|---|---|
| *C08K 3/34* | (2006.01) |
| *C08K 5/549* | (2006.01) |
| *C08K 5/00* | (2006.01) |
| *C08L 33/12* | (2006.01) |
| *C08K 5/5397* | (2006.01) |
| *C08K 3/013* | (2018.01) |

(52) U.S. Cl.
CPC .............. *C08K 5/5397* (2013.01); *C08K 3/34* (2013.01); *C08K 5/005* (2013.01); *C08K 5/0066* (2013.01); *C08K 5/549* (2013.01); *C08L 33/12* (2013.01); *C08K 3/013* (2018.01); *C08K 2201/011* (2013.01); *C08L 2201/02* (2013.01); *C08L 2201/08* (2013.01)

(58) Field of Classification Search
CPC .. C08K 5/549; C08K 5/00; C08K 3/34; C08L 33/12
USPC ......................................................... 524/117
See application file for complete search history.

(56) References Cited

U.S. PATENT DOCUMENTS

| | | | |
|---|---|---|---|
| 6,439,880 B1 | 8/2002 | Ray | |
| 6,518,357 B1* | 2/2003 | Rajagopalan | ........... C08L 69/00 524/161 |
| 7,214,475 B2 | 5/2007 | Erben et al. | |
| 2005/0282018 A1* | 12/2005 | Van Den Bergen | ......................... B32B 17/10706 428/426 |
| 2007/0275231 A1 | 11/2007 | Meyer et al. | |
| 2011/0129680 A1* | 6/2011 | Van Den Bergen | ......................... B32B 17/10036 428/442 |
| 2012/0052296 A1 | 3/2012 | Ikeno et al. | |
| 2013/0331478 A1* | 12/2013 | La Camera | .......... C08K 5/0025 522/174 |
| 2016/0115299 A1 | 4/2016 | David | |
| 2016/0181576 A1* | 6/2016 | Zouta | ................... C08K 5/5399 429/156 |
| 2016/0264771 A1 | 9/2016 | Watanabe | |

FOREIGN PATENT DOCUMENTS

| WO | WO-2009006168 A1 * | 1/2009 | ............... C08K 3/22 |
|---|---|---|---|
| WO | 2015180888 A1 | 12/2015 | |

OTHER PUBLICATIONS

Richard J. Lewis, Sr., Hawley's Condensed Chemical Dictionary, 1997, Van Nostrand Reinhold, 13th Edition, pp. 1 and 759.*

* cited by examiner

*Primary Examiner* — Deve V Hall
(74) *Attorney, Agent, or Firm* — Polsinelli PC

(57) ABSTRACT

Disclosed herein are compositions, formulations, applications, and methods of making a fire resistant material. The fire resistant material is a transparent acrylic material that incorporates a primary polymer, nanostructured fillers, and crosslinkers. The nanostructured filler is polyhedral oligomeric silsesquioxane (POSS) or a POSS derivative that has a cage like structure. The fire resistant material may also include various components such as brominated additives and phosphorous based synergists. The fire resistant material may be used for various applications including wall claddings and glazings.

9 Claims, 3 Drawing Sheets

FLAME RESISTANT MATERIAL AND RESULTANT PRODUCTS

CROSS-REFERENCE TO RELATED APPLICATION

This application claims the benefit of priority to U.S. Provisional Application No. 62/410,177 entitled "Flame Resistant Material," filed Oct. 19, 2016, the entire contents of which are hereby incorporated herein by reference. This application also claims the benefit of priority to U.S. Provisional Application No. 62/456,516 entitled "Flame Resistant Material," filed Feb. 8, 2017, the entire contents of which are hereby incorporated herein by reference.

BACKGROUND

Fire and extreme heat can present problems for buildings. Since many conventional building materials are either flammable or present hazardous risks when in contact with extreme heat and fire the potential for losses are tremendous and further then effect fire insurance rates as well as the general public safety. In particular the building industry has attempted to create fire resistant glass or acrylic technologies through the use of intumescent fillers or coatings to accomplish fire resistance when used in building construction. These intumescent fillers or coatings create a char layer that acts as a barrier to further oxidation. Examples of intumescent fillers that are currently used include, ammonium polyphosphate, zinc borates, and metaborates. Other technologies accomplish fire resistance by utilizing materials that release large amounts of water to extinguish flames as flames are generated. Other efforts have used brominated materials.

The current technologies using mineral based fillers containing water within the molecular structure or charring material may form toxic materials once exposed to fire or high temperatures. For example, when exposed to high temperatures, brominated materials release toxic smoke that contains bromine radicals in the gas phase. The problem arising from most of the materials that inhibit burning are that they are insoluble solids; therefore, the end product is opaque, stiff, difficult to form, and of limited use in light transmission applications.

What is needed is a clear or transparent thermoformable fire resistant acrylic material that, can be used for the replacement of glass or acrylic building materials, such as windows that when exposed to fire or high temperatures, forms less toxic materials than traditional materials currently used for gas phase inhibition.

SUMMARY

The invention generally relates to a fire resistant material and the building materials or products that incorporate these fire resistant materials. The fire resistant material may be transparent or opaque. The fire resistant material generally comprises a primary polymer, a nanostructured filler, and at least one crosslinker. The primary polymer may be an acrylic, acrylic glass, or acrylic resin. In some embodiments the primary polymer is poly(methyl methacrylate) (PMMA). The nanostructured filler may be polyhedral oligomeric silsesquioxane (POSS) or a POSS derivative that has a cage like structure.

The fire resistant material may include additional components such as a mold release. The fire resistant material may also include a UV inhibitor. The fire resistant material may include other known flame retardant ingredients. The fire resistant material may include one or more radical sources. The fire resistant material may include one or more brominated additives such as a polymeric brominated acrylate flame retardant. The fire resistant material may include a phosphorous based synergist such as 9, 10 Dihydro-9-oxa-10-phosphaphenanthrene 10 oxide (DOPO). The fire resistant material may include a radical source that provides gas inhibition properties.

The fire resistant material may be made by mixing at least one crosslinker, at least one UV inhibitor, at least one mold release component, at least one or more radical source, at least one polymer initiator, at least one brominated additive, and at least one phosphorous based synergist to make a slurry or a syrup. The mixture is then placed in a mold where the mixture is cured using heat to create the fire resistant material, and then used for construction or building purposes.

Details of one or more implementations are set forth in the accompanying drawings and the description below. Other features and advantages may be apparent from the description and drawings, and from the claims.

DETAILED DESCRIPTION

Figure 1:
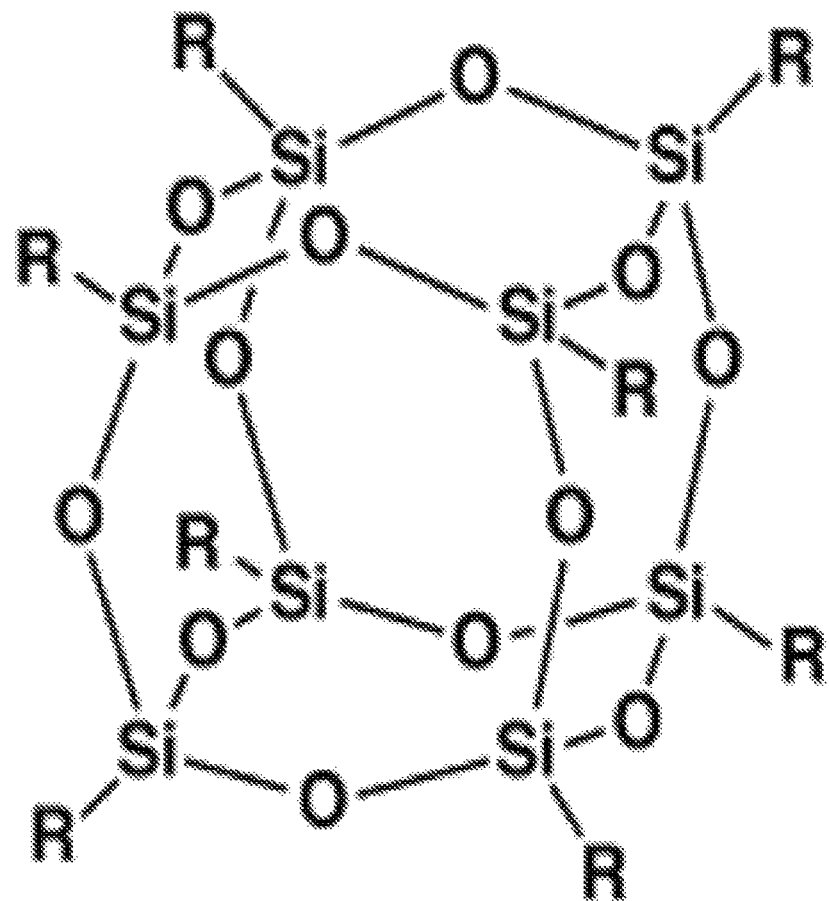
FIG. 1 is an illustration of a substituted POSS molecule.

The invention is to a fire resistant material as shown in FIGS. 1-4 a method of making the fire resistant acrylic material and the resultant uses for the fire resistant material such as incorporated into building or construction products. The invention also relates to glazings and wall claddings that incorporate the fire resistant material and methods of making glazings and wall claddings that incorporate the fire resistant material or a flame resistant chemical compound. Specifically, the invention is to a fire resistant acrylic material that incorporates nanostructured fillers that have many uses within the construction industry as well as other related industries. Additionally, the fire resistant material generally relies on a combination of flame spread retardation along with gas phase retardation. The fire resistant acrylic material is created by using a combination of acrylic polymers and additives that slow the rate of burning while retarding the gas phase evolution of radicals.

In one embodiment the fire resistant material includes at least one primary polymer component and at least one nanostructured filler component. In other alternative embodiments, the primary polymer is an acrylic. In some embodiments, the fire resistant material may include one or more crosslinkers. In some embodiments, fire resistant material may include one or more UV inhibitors. In some embodiments, the fire resistant material may include one or more mold release components. In some embodiments, the fire resistant material may include one or more radical sources. In some embodiments, the fire resistant material may include one or more brominated additives. In some embodiments, the fire resistant material may include a synergist. The addition and/or inclusion of other elements with the fire resistant materials will depend on the desired use of the product. Because the fire resistant acrylic material may be used as a glass replacement, the fire resistant acrylic material may include a polymer component that is clear. In other embodiments the polymer may be opaque.

In one embodiment, the primary polymer is an acrylic that is combined with a nanostructured filler. In some embodiments, the primary polymer may be a compound that contains an acryloyl group derived from acrylic acid. In other embodiments, the primary polymer may be an acrylic fiber. In yet other embodiments, the primary polymer may be a transparent thermoplastic such as acrylic glass or poly (methyl methacrylate) (PMMA). In other embodiments the primary polymer may be an acrylic resin. In other embodiments the primary polymer may be chosen from a group of polymers or plastics that are generally transparent and used in the industry, including but not limited to acrylate polymers. One of skill in the art will appreciate that the fire resistant material may also include one or more monomers. One of skill in the art will further appreciate that the primary polymer may be any polymer known in the art that can be combined with a nanostructured filler.

In addition to the primary polymer component, the fire resistant material may additionally include a nanostructured filler. In some embodiments, the nanostructured filler will be modified with reactive groups. In many embodiments the nanostructured filler may be a compound or composition that has been modified with reactive groups which allow the filler to become incorporated with the primary polymer. In some embodiments, the nanostructured filler may be a compound or composition that has been modified with reactive groups which allow the filler to become the polymer backbone for the composition. One of skill in the art will appreciate that the nanostructured filler may be any nanostructured filler that can be combined with a polymer leading to the filler being incorporated into the polymer or the filler becoming the polymer backbone.

Figure 2A:
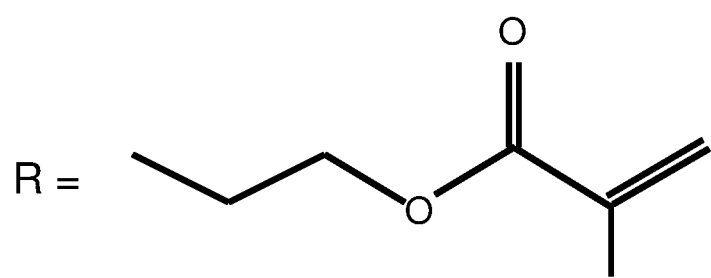
FIG. 2A is an illustration of a methacrylate R group.
Figure 2B:
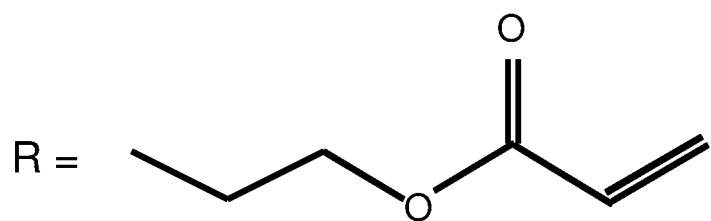
FIG. 2B is an illustration of an acrylate R group.
Figure 3:
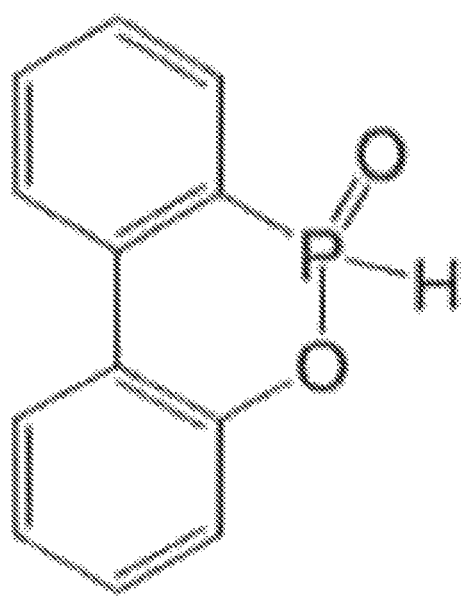
FIG. 3 is an illustration of a substituted DOPO molecule.

In general the filler has a cage like or polymeric nanostructure. In some embodiments, the filler may be polymeric structures with Si—O—Si linkages. In some embodiments, the filler is a polyhedral oligomeric silsesquioxane (POSS) nanostructure. The chemical composition of POSS is $RSiO_{1.5}$. In this regard, POSS may be considered to be a hybrid, intermediate between that of silica ($SiO_2$) and silicone ($R_2SiO$). The POSS nanostructure generally has an inorganic portion and an organic portion. The organic portion of the POSS nano structure may be any POSS nano structure including, but not limited to octa hydrido POSS, octa methyl POSS, octa ethyl POSS, octa iso-butyl POSS, octa iso-octyl POSS, and methacryl POSS and/or combinations thereof. One of skill in the art will also appreciate that the nano structured filler may be any POSS or POSS derivative that has a cage like structure. In some embodiments, the POSS has a methacrylate or acrylate end group (R) attached to each of the 8 corners of the cubic silsesquioxane structure as shown in FIGS. 1-2. The POSS has multiple points of possible polymerization, the additive may have the additional advantage of increase crosslinking. In embodiments that include a methacrylate or acrylate substituent, the acrylic groups react with the polymer chain and thus create a composition where the acrylic groups become part of the polymeric superstructure. In some embodiments, the compatibility of the PMMA and the POSS allows for a clear and light transmitting structure that is desired by a user.

In embodiments that include a synergist, the synergist may be any synergist known. In some embodiments the synergist may be phosphorus based. The synergist may be a compound or molecule that acts as a radical trap in the gas phase. In some embodiments the synergist may be 9, 10 Dihydro-9-oxa-10-phosphaphenanthrene 10 oxide (DOPO).

In embodiments that use a phosphorous based synergist, the synergist may be any molecule that, when exposed to high temperatures, degrades making the phosphorous able to react with oxygen free radicals in the gas phase. In this regard, the release of phosphorus may help slow the rate of burn by capturing and neutralizing radicals or reducing the available oxygen needed for the flame. In some embodiments, the synergist may be any molecule that, upon burning, tends to rearrange to form a hard ceramic layer on the polymer surface, instead of forming a char layer. One of skill in the art will appreciate that the synergist may be any synergist that is known to be used in a flame retardant capacity.

The fire resistant material includes molecules that are polymer initiators. One of skill in the art will appreciate that the polymer initiator may be an initiator that is known to be used in all types of initiation. Types of initiation include but are not limited to thermal decomposition, photolysis, redox reactions, persulfates, ionizing radiation, electrochemical (electrolysis), plasma, and sonication. In some embodiments, the initiator may be one or more chosen from the free radical initiators, examples include but are not limited to nitroxide-mediated radical (NMP) initiators. One of skill in the art will appreciate that any initiator may be used, including initiators chosen from any initiator group named herein.

The fire resistant material may be made from a composition that include various amounts of POSS in addition to the primary polymer, additional monomers, crosslinkers, UV inhibitors/absorbers, mold release, radical source, flame retardant additives, flame retardant synergists, and any optional polymer initiators or polymer inhibitors. The amount of primary polymer in the composition may vary. In general, the weight percent of primary polymer to the total composition may range from 45-52% (w/w).

The amount of monomer in the composition may vary and will include monomers known in the industry. In general, the weight percent of monomer to the total composition may range from 41-47% (w/w).

The composition my include crosslinkers known in the industry including but not limited to Polyethylene glycol dimethacrylate; 1,6-Hexanediol diacrylate; 1,6-Hexanediol dimethacrylate; 1,9-Nonanediol dimethacrylate; 1,4-Butanediol dimethacrylate; 1,3-Butanediol dimethacrylate; 1,10-Decanediol dimethacrylate; Diurethane Dimethacrylate; 1,4-Butanediol diacrylate; Ethylene glycol diacrylate; 1,5-Pentanediol dimethacrylate; 1,4-Phenylene diacrylate; Allyl methacrylate; 2,2-B is [4-(2-hydroxy-3-methacryloxypropoxy)phenyl]propane; Tricyclodecane dimethanol diacrylate; Tetraethylene glycol diacrylate; Polyethylene glycol diacrylate; B is (2-methacryloxyethyl) phosphate; Ethylene Glycol Dimethacrylate; Diethylene glycol diacrylate; Diethylene glycol dimethacrylate; Triethylene glycol diacrylate; Triethylene glycol dimethacrylate; Tetraethylene glycol dimethacrylate; Polyethylene glycol diacrylate; Polyethylene glycol dimethacrylate; Triethylene glycol dimethacrylate; N,N-Diallylacrylamide and combinations thereof. The amount of crosslinker in the composition may vary and will include crosslinkers known in the industry. In general, the weight percent of crosslinker to the total composition may range 0.5%-1.0% (w/w).

The composition may include UV inhibitors that prevent oxidation of the polymers. The UV inhibitor may be a UV absorber that dissipates absorbed light energy from UV rays. In some embodiments, the UV inhibitor may be UV stabilizers that include benzotriazoles and benzophenones, hindered amine light stabilizers (HALS), and benzoates. The amount of UV inhibitor in the composition may vary dependent on the preferred fire resistant material to be created and will include UV inhibitors known in the industry. In general, the weight percent of UV inhibitor to the total composition may range from 0.2%-0.4% (w/w).

The composition may include one or more mold release agents to aid in freeing the flame resistant material from a mold. The mold release may include fatty acid derivatives and esters and alkyl sulfosuccinates. In some embodiments the mold release is mixed into the composition. In other embodiments, the mold release may be applied to the mold before the slurry or syrup is placed in the mold. One of skill in the art will appreciate that the mold release may be any mold release known in the industry and used with acrylics. The amount of mold release in the composition may vary and will include mold release agents known in the industry. In general, the weight percent of mold release to the total composition may range from 0.2%-0.4% (w/w).

The fire resistant material may include a radical source to provide properties of gas phase inhibition. The radical source may also be necessary for wall cladding and coatings. The radical source may be hydroquinone based inhibitors, nitroxide based controlled radicals, high temperature decomposing peroxides such as dicumyl peroxide, di-(tert-butylperoxyisopropyl)benzene, 2,3-dimethyl-2,3-diphenyl butane, Poly (1,4-diisopropyl benzene), and other free radical generators with a decomposition temperature above 300° C. One of skill in the art will appreciate that the radical source may be any radical source known in the art. The amount of radicals in the composition may vary. In general, the weight percent of radical source to the total composition may range from 0%-1.0% (w/w).

The fire resistant material may further include one or more flame retardant additives that are known within the industry. In some embodiments the flame retardant additives may have reactive groups that allow the additive to react into the polymeric structure of the final flame resistant material, thus permanently imparting flame resistant properties. In some embodiments, the flame retardant additive may act as a filler in the final fire resistant material. The amount of the flame retardant additives in the composition may vary. In general, the weight percent of flame retardant additive to the total composition may range from 0.5%-5.0% (w/w). In some embodiments a first and a second flame retardant additive may be included in the fire resistant material. In such embodiments, the weight percent of the first flame retardant additive to the total composition may range from 0.5%-3.0% (w/w), and the weight percent of the second flame retardant additive to the total composition may range from 0.5%-15.0% (w/w).

The amount of POSS in the composition may vary. In general, the weight percent of POSS to the total composition may range from 0% to 25% (w/w). In various embodiments, the weight percent of POSS to the total composition may be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% (w/w). In exemplary embodiments, the weight percent of POSS in the total composition may range from about 5% to about 30% (w/w). In some exemplary embodiments, the weight percent of POSS in the total composition may range from about 0.1% to about 5% (w/w). In other exemplary embodiments, the weight percent of POSS in the total composition may range from about 1% to about 1.5% (w/w). In other exemplary embodiments, the weight percent of POSS in the total composition may be about 1.25% (w/w).

In general, the polymerization initiator may be any chemical or composition know in the art for initiating polymerization. Polymerization initiators may include but are not limited to benzoyl peroxide, Lauroyl peroxide, Diisononanoyl peroxide, Di-succinic acid peroxide, t-butyl peroxy 2-ethylhexanoate, t-amyl peroxy 2-ethylhexanoate, 2-ethylhexyl peroxy 2-ethylhexanoate, myristal peroxydicarbonate, t-butyl peroxy pivalate, t-amyl peroxy pivalate, t-butyl peroxy acetate, t-amyl peroxyacetate, t-butyl peroxy benzoate, and t-amyl peroxy benzoate and combinations thereof. The amount of polymer initiators in the composition may vary and will include initiators known in the industry. In general, the weight percent of polymer initiators to the total composition may range from 0.1%-1% (w/w). In other exemplary embodiments, the weight percent of polymer initiators in the total composition may range from about 0.25% to about 1% (w/w).

In general, the polymerization inhibitor may be any chemical or composition know in the art for inhibiting polymerization. Polymerization inhibitors may include but are not limited to but are not limited to hydroquinone, methyl ether of hydroquinone, and 2,4-Dimethyl-6-tert-butylphenol in either the monomeric or polymeric form and combinations thereof. The amount of polymer inhibitors in the composition may vary and will include inhibitors known in the industry. In general, the weight percent of polymer inhibitors to the total composition may range from 0.001%-0.2% (w/w).

The fire resistant material composition may be mixed and processed to create a flame retardant and moisture resistant material. In some embodiments, the fire resistant material is transparent or clear. It is also understood that the fire resistant material may be opaque. In opaque or transparent embodiments the fire resistant material may have no color or be colored. One of the skill in the art will appreciate that the fire resistant material may be any color, including but not limited to red, yellow, orange, blue, green, grey, or any other color known in the glass or acrylic industry.

In some embodiment, the sheet of fire resistant material may be 0.25 inches thick. In other embodiments, the sheet may be less than 0.25 inches thick. In additional embodiments the thickness of the sheet can be between 0.25 inches and 2.0 inches. In some embodiments the thickness of the sheet may be 4 inches. In some embodiments the thickness of the sheet may be more than 4 inches. In some embodiments, the sheet may be as thick as 30 inches. In some embodiments a panel having a thickness greater than 4 inches may be desired. In such embodiments, several sheets may be layered by using a suitable means known in the art for layering sheets. In some embodiments, the sheets may be layered using an adhesive known in the art. In other embodiments, the sheets may be layered using heat. One of skill in the art will appreciate that sheets may be layered using any means known in the art to create the desired thickness. In some embodiments, a sheet having a thickness greater than 4 inches may be made using a single sheet without layering sheets together. One of skill in the art will appreciate that the fire resistant material may have a thickness that is generally used for glass or other acrylic products. In some embodiments, the fire resistant material is thermoformable allowing it to be usable in many construction and architectural applications. One of skill in the art will appreciate that the fire resistant material can be formed using any acrylic forming techniques known in the art. Accordingly, one of skill in the art will additionally appreciate that the fire resistant material may be processed to take any form known in the art. In additional embodiments the products and materials may also use the flame resistant material within the industries of aerospace, for ballistic/impact resistant materials, and blast mitigation materials.

Applications

The fire resistant material may be used for various applications. By way of non-limiting example, the fire resistant material may be used in applications such as windows for buildings, automobiles, or any other place that windows may be present. One of skill in the art will appreciate that the fire resistant material may be used as any window known in the art. The fire resistant material may be used as glazing for skylights, windows, and any other application known in the art that allows light to enter or leave a structure. The fire resistant material may be used in projection screens, including two sided projection screens. The fire resistant material may also be used as a bullet resistant or bullet proof glass.

In some embodiments, the fire resistant material may be used as a wall cladding. Wall claddings must meet stringent fire and smoke resistance requirements because the material may cover entire structural surfaces. Wall cladding applications may include wall fixtures, wall decorations, and furniture type materials that are typically inside a building. When burned, wall cladding may propagate fire in a vertical direction, which may lead to smoke escaping into adjacent rooms. The fire resistant material, which may be useful in wall cladding applications, is useful because the flame resistant material has self-extinguishing and flame retardation properties. One of skill in the art will appreciate that the flame resistant material may be used as any wall cladding known in the art. Because wall cladding and glazing applications may have different standards, the formulations of the two applications may include different additives, loading levels, and other components.

Method

In some embodiments, the fire resistant material may include a mixture of at least one polymer and at least one nano structured filler which form an acrylic. The fire resistant material may be formed using any techniques known in the art.

In one embodiment the components of the formulation are blended. In some embodiments, the blended formulation may be stirred for a period of up to 1 hour. In some embodiments, the blended formulation is stirred for more than 1 hour. In some embodiments, the components of the formulation are mixed in a hot water bath until thickened. In some embodiments, the blended and stirred formulation is degassed until sufficiently air-free. In various embodiments the degassed formulation may be poured into a sheet mold or other suitable mold. The mold may be closed, and placed into a heating vessel for curing and finishing. In some embodiments, the fire resistant material is created using continuous cell cast in an autoclave. In other embodiments, the fire resistant material is created using a typical aerospace type of autoclave used for curing the cast sheet by heating to the operating temperature of ambient to 175° C. and with nitrogen pressure from ambient to 100 psi. The material may also be cured at temperatures higher or lower than 175° C. One of skill in the art will appreciate that the material may be cured at any temperature known in the art. The material may also be cured at nitrogen pressures higher than 100 psi. In some embodiments, the fire resistant material is created using a hydroclave. One of skill in the art will appreciate that the fire resistant material may be created using any water filled vessel operating at temperatures of a typical autoclave. In some embodiments the hydroclave may have a water flow rate in the 10-50 gallons per minute range. In other embodiments, the fire resistant material is created using a water bath. In water bath embodiments the water bath is a water filled vessel that is open air, operating under ambient pressure and temperatures from 0-100° C. One of skill in the art will appreciate that a heating vessel may be any heating vessel known in the art, including but not limited to autoclave, water bath, or hydroclave.

In one embodiment the fire resistant material is formed by creating a slurry with a PMMA molecular weight of 100K to 500K. The slurry may be created using a premix of an amount of a monomer, a crosslinker, a mold release, a UV absorber, an inhibitor, and flame retardant additives. In embodiments where coloring is desired, an amount of a colorant may be mixed with the components. The components may be mixed with methyl methacrylate monomer for a short period of time until a homogeneous mixture is created. In some embodiments the mixture may be mixed for 1-5 minutes. In other embodiments the mixture may be mixed for up to an hour. An amount of solid PMMA powder may be slowly added to the mixture with the mixture being mixed to a consistency appropriate for pouring into a prepared mold. The slurry may be monitored to ensure the determined viscosity is met with the blend. The period of time for mixing may vary according to the desired use and the desired viscosity which may be determined by monitoring the viscosity of the blend as it forms. In some embodiments the flame resistant material may be incorporated into a large profile panel. When creating a large profile panel multiple mixes may be used to fill the casting mold.

In alternative embodiments a syrup may be made by starting with a monomeric methyl methacrylate and polymerizing the mixture to a fixed viscosity. The reaction may then be quenched using a radical inhibitor. The mixture may also include additional additives as required. The mixture may then be re-initiated and the resultant syrup may be poured into the casting molds. In embodiments where a syrup is used, the mixture may be placed in a heating vessel and polymerized using appropriate temperature and pressure.

The mixture or slurry may be transferred to a pre-prepared mold, the top of the mold may be attached and secured in place with gasketing to prevent escape of the viscous mixture during heating. The mixture may then be placed in an appropriate heating vessel under inert atmosphere and heated under a preset temperature program to enable polymerization of the materials into a solid, single cast, transparent sheet. The mode of heating may be any method currently known in the industry and may include but is not limited to autoclave, hydroclave (water driven autoclave), or a waterbath. The amount of time required for the polymerization will be depend on the thickness of the panel and the potential product being created. Once the panel has finished forming into the final sheet, the reaction vessel is slowly cooled over 1-3 days to prevent excessive stress retention. One of skill in the art will appreciate that the reaction vessel may be cooled over a period of more than 3 days. After cooling, the panel is demolded and further machined, annealed, and thermoformed into the final desired structure.

EXAMPLES

Experiments were performed to provide direct comparison of the flame resistant material compares to typical acrylic materials based on various flame resistant (FR) test criteria.

Example 1: Additive Flame Retardant Test-Certification

The objective of the study was to determine if the flame resistant material would qualify for compliance with fire safety codes and regulations. The testing included measuring ignition temperature, surface flame spread, burning rate and release rate of smoke. The results from each test were compared to UL 94 related ASTM test standards to determine if the material was able to meet fire code regulations.

Reagents/Formulations:

Three flame retardant containing acrylics were tested: Borax Firebrake Zinc Borate (5% loading)—Experiment 2; CAB-O-SIL EH-5 (2% loading)—Experiment 3; Acrylo POSS Cage Mixture (1% loading)—Experiment 4.

Procedure:

The following flame retardant testing methods were completed: ASTM D2843 (smoke density) in correlation with ASTM D635 (rate of burning); 1 in×1 in×¼ in samples (10 of each); ASTM D1929 (ignition temperature); 20 mm×20 mm×3 gram wt; UL 94 V (vertical burn test); 125 mm×13 mm×3 mm (6 of each).

Results/Conclusions:

ASTM D2843 (smoke density) in correlation with ASTM D635 (rate of burning).

Acrylo POSS Cage Mixture (1% loading)—Average smoke density is 2.3 and 21.8 rate of burn which overall has a lighting class of CC1 (same as polycarbonate).

CAB-O-SIL EH-5 (5% loading)—Average smoke density is 5.4 and 27.1 rate of burn which overall has a lighting class of CC2.

Borax Firebrake Zinc Borate (5% loading)—Average smoke density is 5.9 and 33.2 rate of burn which overall has a lighting class of CC2.

Example 2: Additive Flame Retardant Test Experiment 1

The objective of this test was to determine if the flame resistant material will limit the alterations of the mechanical properties of the material, but also allow the material to prevent large fires. Flame retardant additives in thermoplastic sheets act as resistors of materials to ignite, and once ignited, to limit the spread of the flame. Because the thermoplastic sheets act as a glass replacement, the first test was performed to determine if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

Non-Synergistic Formulation for 5% Loading:

Flame Retardant Additive-60 g

Polymer—480 g

Monomer—684 g

Premix—12 g

Synergistic Formulation for 5% Loading:

Flame Retardant Additive—60 g

Metaborate (synergist)—2% (24 g)

Polymer—480 g

Monomer—684 g

Premix—12 g

Additive Information:

Cabot® provided the following samples:

CAB-O-SIL® EH-5

CAB-O-SIL® MS-75D

CAB-O-SIL® LM-150

Procedure:

Example 3: Additive Flame Retardant Test-Experiment 2

The objective of this test was to determine if the flame resistant material will limit the alterations of the mechanical properties of the material, but also allow the material to prevent large fires. Flame retardant additives in thermoplastic sheets act as resistors of materials to ignite, and once ignited, to limit the spread of the flame. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

Non-Synergistic Formulation for 5% Loading:

Flame Retardant Additive-100 g

Polymer—800 g

Monomer—1,080 g

Premix—20 g

Additive Information:

CheMarCo provided the following samples:

JLS APP

JLS Melamine Cyanurate

Borax Firebrake Zinc Borate

Procedure:

Three glass Pyrex pans were obtained. The above formulations were mixed, one for each separate sample, in the pans and placed in the refrigerator overnight after being degassed. The pans were then placed in the autoclave to allow the slurry to polymerize. Once taken out of the autoclave, the samples were visually analyzed to determine if the additive turned the material opaque or left it transparent. The samples were analyzed using DMA and DSC to determine how the mechanical properties were altered due to the additive.

TABLE 1

DSC results.

| Sample | Heating Number | Tg (° C.) | Average (° C.) | Standard Deviation |
|---|---|---|---|---|
| Firebrake A | 1 | 114.5 | 123.7 | 0.55 |
|  | 2 | 123.2 |  |  |
|  | 3 | 124.1 |  |  |
| Firebrake B | 1 | 119.9 |  |  |
|  | 2 | 123.6 |  |  |
|  | 3 | 124.5 |  |  |
| Firebrake C | 1 | 118.1 |  |  |
|  | 2 | 123.1 |  |  |
|  | 3 | 123.4 |  |  |
| JLS-APP A | 1 | 115.2 | 122.2 | 1.1 |
|  | 2 | 123.3 |  |  |
|  | 3 | 122.7 |  |  |
| JLS-APP B | 1 | 113.2 |  |  |
|  | 2 | 120.7 |  |  |
|  | 3 | 121.0 |  |  |

TABLE 1-continued

DSC results.

| Sample | Heating Number | Tg (° C.) | Average (° C.) | Standard Deviation |
|---|---|---|---|---|
| JLS-APP C | 1 | 115.6 | | |
| | 2 | 122.4 | | |
| | 3 | 122.8 | | |
| JLS-MC25D A | 1 | 115.0 | 122.4 | 0.53 |
| | 2 | 121.9 | | |
| | 3 | 122.6 | | |
| JLS-MC25D B | 1 | 116.5 | | |
| | 2 | 121.7 | | |
| | 3 | 122.2 | | |
| JLS-MC25D C | 1 | 116.3 | | |
| | 2 | 122.9 | | |
| | 3 | 123.0 | | |

TABLE 2

DMA results.

| Sample | Storage Modulus @ 25° C. | Tg (° C.) |
|---|---|---|
| JLS-APP | 1882 | 128.7 |
| Firebrake | 1683 | 120.6 |
| JLS-MC-25D | 1613 | 123.0 |

Results/Conclusions:

JLS-APP had a slight yellow tint. Firebrake was opaque but was thought to possibly work for colored panels. JLS-MC25D did not mix to the consistency of interest—possibly mix for longer period of time in order to achieve consistency.

Example 4: Additive Flame Retardant Test-Experiment 3

The objective of this test was to determine if the flame resistant material will limit the alterations of the mechanical properties of the material, but also allow the material to prevent large fires. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Non-Synergistic Formulation for 2% Loading:

Continuing with CAB-O-SIL flame retardant from Experiment 1 (no synergist only)—determined how much flame retardant needed to be added to remaining amount in order to have 2% loading. Only EH-5 and MS-75D were retested.

Flame Retardant Additive: 40 g
Polymer: 860 g
Monomer: 1,080 g
Premix: 20 g
310 ATH—Non-Synergistic Formulation for 5% Loading:
Flame Retardant Additive: 40 g
Polymer: 860 g
Monomer: 1,080 g
Premix: 20 g
302 ATH—Synergistic Formulation for 5% Loading:
Flame Retardant Additive: 40 g
Polymer: 860 g
Monomer: 1,080 g
Premix: 20 g
Metaborate (Synergist)—40 g
Additive Information:
Cabot provided the following samples:
CAB-O-SIL EH-5
CAB-O-SIL MS-75D
Procedure:

Four glass Pyrex pans were obtained. The above formulations were mixed, one for each separate sample, in the pans and placed in the refrigerator overnight after being degassed. The pans were then placed in the autoclave to allow the slurry to polymerize. Once taken out of the autoclave, the samples were visually analyzed to determine if the additive turned the material opaque or left it transparent. The samples were analyzed using DMA and DSC to determine how the mechanical properties were altered due to the additive.

TABLE 1

DSC results.

| Sample | Heating Number | Tg (° C.) | Average (° C.) | Standard Deviation |
|---|---|---|---|---|
| EH-5 A | 1 | 118.4 | 123.8 | 0.17 |
| | 2 | 123.7 | | |
| | 3 | 123.9 | | |
| EH-5 B | 1 | 117.9 | | |
| | 2 | 123.8 | | |
| | 3 | 124.1 | | |
| EH-5 C | 1 | 117.5 | | |
| | 2 | 123.6 | | |
| | 3 | 123.8 | | |
| ATH (syn) A | 1 | 113.5 | 122.4 | 0.40 |
| | 2 | 122.5 | | |
| | 3 | 122.8 | | |
| ATH (syn) B | 1 | 113.6 | | |
| | 2 | 122.1 | | |
| | 3 | 122.5 | | |
| ATH (syn) C | 1 | 112.3 | | |
| | 2 | 121.8 | | |
| | 3 | 122.8 | | |
| ATH (no syn) A | 1 | 117.6 | 122.9 | 0.45 |
| | 2 | 122.6 | | |
| | 3 | 122.6 | | |
| ATH (no syn) B | 1 | 117.2 | | |
| | 2 | 122.3 | | |
| | 3 | 123.4 | | |
| ATH (no syn) C | 1 | 116.9 | | |
| | 2 | 123.4 | | |
| | 3 | 122.9 | | |
| MS-75D A | 1 | 119.3 | 123.4 | 0.37 |
| | 2 | 123.4 | | |
| | 3 | 123.0 | | |
| MS-75D B | 1 | 114.1 | | |
| | 2 | 123.2 | | |
| | 3 | 123.4 | | |
| MS-75D C | 1 | 118.5 | | |
| | 2 | 123.4 | | |
| | 3 | 124.1 | | |

TABLE 2

DMA results.

| Sample | Storage Modulus @ 25° C. | Tg (° C.) |
|---|---|---|
| ATH (syn) | 1453 | 100.3 |
| EH-5 | 1872 | 114.6 |
| ATH (no syn) | 1290 | 113.7 |
| MS-75D | 1492 | 121.6 |

Results/Conclusions:

ATH results were very cloudy. When mixing in warm water all EH-5 material fit into solution but not all of the MS-75D. EH-5 was transparent whereas MS-75D had some small clumps of material and had a blow out in the middle of the sample.

Example 5: Additive Flame Retardant Test-Experiment 4

The objective of this test was to determine if the flame resistant material will limit the alterations of the mechanical properties of the material, but also allow the material to prevent large fires. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

No premix was necessary because POSS has 8 substituents that allow it to act as a caging agent similar to the premix.

Non-Synergistic Formulation for 2% Loading:
Flame Retardant Additive: 40 g
Polymer: 783 g
Monomer: 1,187 g
Non-Synergistic Formulation for 1% Loading:
Flame Retardant Additive: 20 g
Polymer: 783 g
Monomer: 1,197 g
Non-Synergistic Formulation for ½% Loading:
Flame Retardant Additive: 10 g
Polymer: 783 g
Monomer: 1,207 g
Additive Information:
Hybrid Plastics provided the following sample:
Acrylo POSS Cage Mixture
Procedure:

Three glass Pyrex pans were obtained. The above formulations were mixed, one for each separate sample, in the pans and placed in the refrigerator overnight after being degassed—the samples did not need to be degassed for long. The pans were then placed in the autoclave to allow the slurry to polymerize. Once taken out of the autoclave, the samples were visually analyzed to determine if the additive turned the material opaque. The samples were analyzed using DMA and DSC to determine how the mechanical properties were altered due to the additive.

TABLE 1

DSC results.

| Sample | Heating Number | Tg (° C.) | Average (° C.) | Standard Deviation |
|---|---|---|---|---|
| POSS 2% A | 1 | 113.6 | 123.0 | 0.57 |
|  | 2 | 123.6 |  |  |
|  | 3 | 123.8 |  |  |
| POSS 2% B | 1 | 116.3 |  |  |
|  | 2 | 123.0 |  |  |
|  | 3 | 122.8 |  |  |
| POSS 2% C | 1 | 116.6 |  |  |
|  | 2 | 122.3 |  |  |
|  | 3 | 122.7 |  |  |

TABLE 1-continued

DSC results.

| Sample | Heating Number | Tg (° C.) | Average (° C.) | Standard Deviation |
|---|---|---|---|---|
| POSS 1% A | 1 | 116.5 | 122.2 | 0.30 |
|  | 2 | 122.2 |  |  |
|  | 3 | 122.6 |  |  |
| POSS 1% B | 1 | 116.1 |  |  |
|  | 2 | 122.1 |  |  |
|  | 3 | 122.5 |  |  |
| POSS 1% C | 1 | 120.8 |  |  |
|  | 2 | 121.9 |  |  |
|  | 3 | 121.9 |  |  |
| POSS ½% A | 1 | 116.2 | 122.7 | 0.19 |
|  | 2 | 122.7 |  |  |
|  | 3 | 122.9 |  |  |
| POSS ½% B | 1 | 114.3 |  |  |
|  | 2 | 122.8 |  |  |
|  | 3 | 122.5 |  |  |
| POSS ½% C | 1 | 118.6 |  |  |
|  | 2 | 122.6 |  |  |
|  | 3 | 122.4 |  |  |

TABLE 2

DMA results.

| Sample | Storage Modulus @ 25° C. | Tg (° C.) |
|---|---|---|
| POSS (2%) | 1840 | 117.9 |
| POSS (1%) | 1371 | 122.8 |
| POSS (½%) | 1823 | 123.1 |
| POSS (1%) | 1303 | 112.8 and 123.7 |

Results/Conclusions:

Each formulation had the consistency of interest and did not need to be degassed. The final product was transparent with no points of concern. DMA of first casting of POSS at 1% had lower modulus than at 2% and ½% (which both were around 1800) therefore second casting of POSS at 1% was run and the results were the same.

Example 6

The objective of this test was to determine the flame retardant, mechanical and optical properties of PMMA when blended with POSS and DOPO.

Sample Preparation:

Varying loading combinations of both POSS variations (1-3%) and DOPO (0.5-3%) were added to the PMMA blend and mixed in a hot water bath until thickened. The samples were refrigerated overnight and then placed in an autoclave for 5-10 days under nitrogen at 6.89 KPa.

The acrylic is created via continuous cell cast in the autoclave. A polymerized acrylic slush is poured into a steel mold with desired thickness and then continually heated and cooled until the acrylic has fully reacted and cured. The amount of time the slush mold is placed in the autoclave is based on the thickness of the panel. This process creates transparent acrylic with uniform high molecular weight polymer.

Results:

Mechanical Properties:

Dynamic Mechanical Analyzer (DMA) and Differential Scanning Calorimeter (DSC) results for flame-retardant PMMA.

|  | Standard PMMA | Methacryl POSS/DOPO PMMA | Acrylo POSS/DOPO PMMA |
| --- | --- | --- | --- |
| E' (MPa) | 1850-2100 | 1815 | 1025 |
| DMA Tg (° C.) | 125-133 | 122.8 | 119.8 |
| DSC Tg (° C.) | 118-125 | 118.3 | 117.1 |

Flame Retardancy Results for Standard and Flame Retardant PMMA

|  | Standard PMMA | Methacryl POSS/DOPO PMMA | Acrylo POSS/DOPO PMMA |
| --- | --- | --- | --- |
| ASTM D635 (mm/s) | 0.55 | 0.28 | 0.31 |
| ASTM D1929 (° C.) | 430 | 404 | 461 |
| ASTM D2843 rating | 10 | 2.3 | 2.3 |

Conclusions:

POSS provides excellent flame retardancy for transparent acrylic materials when synergized with DOPO. The ceramic and organic hybrid provides a unique mechanism for flame retardancy that reduces the rate of burn while the synergist helps decrease radical spread in the gas phase. The nature of the additives allows the PMMA to maintain typical optical and mechanical properties. This technology allows for glass replacement in a wide variety of applications.

Example 7: Experiment 5—Acrylo POSS (3% Loading), Methacryl POSS (1%, 2%, and 3% Loading)

The objective of this test was to determine if the flame resistant material will limit the alterations of the mechanical properties of the material, but also allow the material to prevent large fires. Flame retardant additives in thermoplastic sheets act as resistors of materials to ignite, and once ignited, to limit the spread of the flame. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations. Premix was used in this round of experiments because the premix's modulus was lower than expected in experiment 4. Acrylo POSS (3%) was also tested with premix.

Reagents/Formulations:

Non-Synergistic Formulation for Methacryl POSS and Acrylo POSS at 3% Loading:

Flame Retardant Additive: 40 g

Polymer: 783 g

Monomer: 1157 g

Premix: 20 g

Non-Synergistic Formulation for Methacryl POSS at 2% Loading:

Flame Retardant Additive: 20 g

Polymer: 783 g

Monomer: 1177 g

Premix: 20 g

Non-Synergistic Formulation for Methacryl POSS at 1% Loading:

Flame Retardant Additive: 10 g

Polymer: 783 g

Monomer: 1187 g

Premix: 20 g

Additive Information:

Hybrid Plastics provided the following samples:

Methacryl POSS Cage Mixture (MA0735)

Acrylo POSS Cage Mixture (MA0736)

Procedure:

Three glass Pyrex pans were obtained. The above formulations were mixed, one for each separate sample, in the pans. Samples were not refrigerated. Samples were not degassed. The pans were placed in the autoclave for 8 days to allow the slurry to polymerize. Once taken out of the autoclave, the samples were visually analyzed to determine if the additive turned the material opaque or left it transparent. The samples were analyzed using DMA and DSC to determine how the mechanical properties were altered due to the additive.

TABLE 1

DSC results for Methacryl POSS and Acrylo POSS.

| Sample | Heating Number | Tg (° C.) | Average (° C.) | Standard Deviation |
| --- | --- | --- | --- | --- |
| Methacryl POSS 3% A | 1 | 114.1 | 122.6 | 0.46 |
|  | 2 | 121.9 |  |  |
|  | 3 | 122.2 |  |  |
| Methacryl POSS 3% B | 1 | 118.2 |  |  |
|  | 2 | 122.6 |  |  |
|  | 3 | 123.1 |  |  |
| Methacryl POSS 3% C | 1 | 114.6 |  |  |
|  | 2 | 122.6 |  |  |
|  | 3 | 123.2 |  |  |
| Methacryl POSS 2% A | 1 | 108.8 | 122.0 | 0.38 |
|  | 2 | 121.5 |  |  |
|  | 3 | 122.5 |  |  |
| Methacryl POSS 2% B | 1 | 108.4 |  |  |
|  | 2 | 121.7 |  |  |
|  | 3 | 121.9 |  |  |
| Methacryl POSS 2% C | 1 | 110.1 |  |  |
|  | 2 | 121.8 |  |  |
|  | 3 | 122.5 |  |  |
| Methacryl POSS 1% A | 1 | 111.2 | 121.4 | 0.24 |
|  | 2 | 121.0 |  |  |
|  | 3 | 121.3 |  |  |
| Methacryl POSS 1% B | 1 | 112.1 |  |  |
|  | 2 | 121.2 |  |  |
|  | 3 | 121.6 |  |  |
| Methacryl POSS 1% C | 1 | 111.4 |  |  |
|  | 2 | 121.4 |  |  |
|  | 3 | 121.7 |  |  |
| Acrylo POSS 3% A | 1 | 114.3 | 122.7 | 0.59 |
|  | 2 | 122.7 |  |  |
|  | 3 | 123.1 |  |  |

Additive Information:

Cabot Corporation provided the following samples:

CAB-O-SIL TS-610

CAB-O-SIL TS-720

CAB-O-SIL TS-530

Evonik provided the following samples:

AEROSIL R7200

AEROSIL R711

Procedure:

Three glass Pyrex pans were obtained. The above formulations were mixed, one for each separate sample, in the pans and placed in the refrigerator overnight after being degassed—the samples did not need to be degassed for long. The pans were then placed in the autoclave to allow the slurry to polymerize. Once taken out of the autoclave, the samples were visually analyzed to determine if the additive turned the material opaque. The samples were analyzed using DMA and DSC to determine how the mechanical properties were altered due to the additive.

TABLE 1

DSC results.

| Sample | Heating Number | Tg (° C.) | Average (° C.) | Standard Deviation |
|---|---|---|---|---|
| TS-610 A | 1 | 113.4 | 121.12 | 0.107 |
|  | 2 | 121.1 |  |  |
|  | 3 | 121.0 |  |  |
| TS-610 B | 1 | 111.2 |  |  |
|  | 2 | 121.1 |  |  |
|  | 3 | 121.2 |  |  |
| TS-610 C | 1 | 110.4 |  |  |
|  | 2 | 121.0 |  |  |
|  | 3 | 121.3 |  |  |
| TS-720 A | 1 | 116.0 | 122.98 | 0.089 |
|  | 2 | 122.9 |  |  |
|  | 3 | 123.0 |  |  |
| TS-720 B | 1 | 116.7 |  |  |
|  | 2 | 122.9 |  |  |
|  | 3 | 123.1 |  |  |
| TS-720 C | 1 | 118.7 |  |  |
|  | 2 | 122.9 |  |  |
|  | 3 | 123.1 |  |  |
| TS-530 A | 1 | 114.1 | 122.98 | 0.274 |
|  | 2 | 122.6 |  |  |
|  | 3 | 123.1 |  |  |
| TS-530 B | 1 | 114.9 |  |  |
|  | 2 | 122.6 |  |  |
|  | 3 | 123.2 |  |  |
| TS-530 C | 1 | 115.1 |  |  |
|  | 2 | 123.2 |  |  |
|  | 3 | 123.2 |  |  |
| R7200 A | 1 | 121.0 | 123.47 | 0.314 |
|  | 2 | 123.4 |  |  |
|  | 3 | 124.0 |  |  |
| R7200 B | 1 | 114.9 |  |  |
|  | 2 | 123.7 |  |  |
|  | 3 | 123.4 |  |  |
| R7200 C | 1 | 114.3 |  |  |
|  | 2 | 123.0 |  |  |
|  | 3 | 123.3 |  |  |
| R711 A | 1 | 114.9 | 122.17 | 0.475 |
|  | 2 | 122.2 |  |  |
|  | 3 | 122.9 |  |  |

TABLE 1-continued

DSC results for Methacryl POSS and Acrylo POSS.

| Sample | Heating Number | Tg (° C.) | Average (° C.) | Standard Deviation |
|---|---|---|---|---|
| Acrylo POSS 3% B | 1 | 120.0 |  |  |
|  | 2 | 123.4 |  |  |
|  | 3 | 121.6 |  |  |
| Acrylo POSS 3% C | 1 | 117.3 |  |  |
|  | 2 | 122.4 |  |  |
|  | 3 | 123.1 |  |  |

TABLE 2

DMA results for Methacryl POSS and Acrylo POSS.

| Sample | Storage Modulus @ 25° C. | Tg (° C.) |
|---|---|---|
| Methacryl POSS (3%) | 1374 | 133.2 |
| Methacryl POSS (2%) | 1394 | 122.0 |
| Methacryl POSS (1%) | 1358 | 127.1 |
| Acrylo POSS (3%) | 1349 | 123.5 |

Results/Conclusions:

Acrylo POSS (3%) was slightly yellow and appeared to have a small fracture in the middle of the sample. Methacryl POSS (3%) had a small ghost in the center of the sample. The small ghost may be a result of inadequate mixing. All Methacryl samples were white but the Acrylo sample was tinted yellow. Appears that 3% will be the upper limit of the amount of POSS material we will be able to add to acrylic, 2% might be optimal.

Example 8: Experiment 6—Hydrophobic Fumed Silica (5% Loading)

The objective of this test was to determine if the flame resistant material will limit the alterations of the mechanical properties of the material, but also allow the material to prevent large fires. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

Trying hydrophobic fumed silica additives (less thickening) whereas in experiments 1 and 3 hydrophilic fumed silica additives (thickening) were used. This material will be used for opaque materials. First, a solubility test was performed on the silica materials to determine the maximum loading levels possible. It was determined that 2% seemed optimal; however, if need be up to 5% could be added for certain materials.

Non-Synergistic Formulation at 2% Loading:

Flame Retardant Additive: 50 g

Polymer: 979 g

Monomer: 1,446 g

Premix: 25 g

TABLE 1-continued

DSC results.

| Sample | Heating Number | Tg (° C.) | Average (° C.) | Standard Deviation |
|---|---|---|---|---|
| R711 B | 1 | 114.8 | | |
| | 2 | 121.9 | | |
| | 3 | 122.5 | | |
| R711 C | 1 | 114.7 | | |
| | 2 | 121.4 | | |
| | 3 | 122.0 | | |

TABLE 2

DMA results.

| Sample | Storage Modulus @ 25° C. | Tg (° C.) |
|---|---|---|
| CAB-O-SIL TS-610 | 1813 | 121.3 |
| CAB-O-SIL TS-720 | 1843 | 127.9 |
| CAB-O-SIL TS-530 | 1671 | 127.2 |
| AEROSIL R7200 | 1610 | 124.0 |
| AEROSIL R711 | 1530 | 104.3 |

Results/Conclusions:

CAB-O-SIL TS 610 exhibited good consistency. CAB-O-SIL TS 720 was thick. The remaining samples had good consistencies with no unusual properties. CAB-O-SIL TS 610 did not fully dissolve and was slightly transparent with a slight yellow tint. CAB-O-SIL TS 530 dissolved fully and was slightly transparent but not yellow. AEROSIL R7200 did not dissolve fully and resulted in a mostly opaque sample with a significant amount of additive on the bottom of sample. AEROSIL 720 completely dissolved, but was very opaque. AEROSIL R711 did not fully dissolve, but was only slightly opaque.

Example 9: Experiment 7—Acrylo and Methacryl POSS (1% and 2%) with Secondary Additives (Bromine (0.25%) and Carbon (0.1%) Radical Traps)

The objective of this test was to determine if the flame resistant material will limit the alterations of the mechanical properties of the material, but also allow the material to prevent large fires. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

Trying the combination of two secondary flame retardant additives in order to stop flame spread in the gas phase. Brominated (0.25%) and carbon radical trap (0.1%) will be used together. These will be added to the 2,500 g samples, not calculated in. The secondary additives will be mixed with both the Acrylo POSS and Methacryl POSS at both 2% and 3% loading.

Formulation for 1% Loading:
Flame Retardant Additive (POSS): 25 g
Brominated Additive (FR 1025): 6.25 g
Carbon Radical Trap Additive: 2.5 g
Polymer: 979 g
Monomer: 1,471 g
Premix: 25 g Formulation for 2% Loading:
Flame Retardant Additive (POSS): 50 g
Brominated Additive (FR 1025): 6.25 g
Carbon Radical Trap Additive: 2.5 g
Polymer: 979 g
Monomer: 1,446 g
Premix: 25 g Additive Information:

United Initiators provided the following samples (carbon radical trap):
CUROX CC-DC Alfa Chemistry provided the following sample (brominated additive):
FR 1025

Hybrid Plastics provided the following samples:
Acrylo POSS Cage Mixture
Methacryl POSS Cage Mixture Procedure:

Three glass Pyrex pans were obtained. The above formulations were mixed, one for each separate sample, in the pans. The pans were then placed in the autoclave for 1 day to allow the slurry to polymerize. Once taken out of the autoclave, the samples were visually analyzed to determine if the additive turned the material opaque. The samples were analyzed using DMA and DSC to determine how the mechanical properties were altered due to the additive.

Results/Conclusions:

All samples were opaque with acrylic expansion in the middle of each sample. Solubility tests were performed to determine whether the carbon or bromine additive was the source of opaqueness. The results indicate that the carbon material fully dissolved in monomer within minutes. After 6 hours the brominated material did not dissolve. Next test were performed to determine if the carbon material alone is enough to retard after burn.

The following solubility tests were performed to determine how much carbon material is able to dissolve in the monomer: ¼%, ½%, 1%, and 2% carbon material will dissolve in monomer within minutes.

Example 10: Experiment 8—Acrylo and Methacryl POSS (1.5%) with Secondary Carbon Radical Trap (1%) and at (½%)

The objective of this test was to determine the flame retardant, mechanical and optical properties of PMMA when blended with POSS and DOPO.

Reagents/Formulations:

The combination in Experiment 7 including two secondary flame retardants (brominated and carbon radical traps) was unsuccessful. The material came out completely opaque. Solubility tests were done in order to determine whether the brominated or carbon material caused the opaqueness due to insolubility.

Formulation for 1.5% Loading 2,500 g:
Flame Retardant Additive (POSS): 38 g
Carbon Radical Trap Additive (1%): 25 g
Polymer: 979 g
Monomer: 1,433 g
Premix: 25 g Additive Information:

United Initiators provided the following samples (carbon radical trap):
CUROX CC-DC Hybrid Plastics provided the following samples:
Acrylo POSS Cage Mixture
Methacryl POSS Cage Mixture Procedure:

Three glass Pyrex pans were obtained. The above formulations were mixed, one for each separate sample, in the pans. Samples were not refrigerated. Samples were not degassed. The pans were placed in the autoclave for 9 days to allow the slurry to polymerize. Once taken out of the autoclave, the samples were visually analyzed to determine if the additive turned the material opaque or left it transparent. The samples were analyzed using DMA and DSC to determine how the mechanical properties were altered due to the additive.

TABLE 1

DMA results Methacryl POSS (1.5%)/Carbon (1%) and Acrylo POSS (1.5%)/Carbon (1%).

| Sample | Storage Modulus @ 25° C. | Tg (° C.) |
|---|---|---|
| Methacryl/Carbon | 1299 | 126.3 |
| Acrylo/Carbon | 1008 | 126.0 |

TABLE 2

DSC results Methacryl POSS (1.5%)/Carbon (1%) and Acrylo POSS (1.5%)/Carbon (1%).

| Sample | Heating # | Tg (° C.) | Average (° C.) | Standard Deviation |
|---|---|---|---|---|
| Methacryl/Carbon A | 1 | 112.9 | 117.4 | 1.80 |
|  | 2 | 120.2 |  |  |
|  | 3 | 117.0 |  |  |
| Methacryl/Carbon B | 1 | 105.3 |  |  |
|  | 2 | 114.9 |  |  |
|  | 3 | 115.7 |  |  |
| Methacryl/Carbon C | 1 | 110.0 |  |  |
|  | 2 | 117.5 |  |  |
|  | 3 | 118.9 |  |  |
| Acrylo/Carbon A | 1 | 113.7 | 118.5 | 1.31 |
|  | 2 | 120.0 |  |  |
|  | 3 | 117.2 |  |  |
| Acrylo/Carbon B | 1 | 113.2 |  |  |
|  | 2 | 118.6 |  |  |
|  | 3 | 119.3 |  |  |
| Acrylo/Carbon C | 1 | 113.0 |  |  |
|  | 2 | 119.4 |  |  |
|  | 3 | 116.3 |  |  |

Results/Conclusions:

The 1% carbon material dissolved quickly into mixture. The samples were not cured after being tested via DMA and DSC. The solubility tests confirmed the brominated material (0.25%) was insoluble in monomer. After 6 hours of being stirred it never dissolved.

The carbon material (0.1%) dissolved in the monomer within minutes of being added. Solubility tests at ¼, ½, 1, and 2% confirmed that increased amounts of the carbon material will dissolve within minutes of being mixed with monomer.

Reagents/Formulations-2$^{nd}$ Round:

Although the material in experiment 8 with 1.5% of each POSS and 1% of carbon radical trap material failed UL-94V testing, the numbers improved greatly. For the applications intended for the flame-retardant acrylic the material does not necessarily need to pass UL-94V test, it is intended more to give an idea if the material will pass larger scale tests. The next step is to make more of the material in the first round of testing in experiment 8 and also try with ½% carbon material to see if the results are significantly different. The material will then be tested via ASTM D1929 and ASTM D635. More information can be found in the "Certification-3$^{rd}$ round" section below.

Formulation for 1.5% POSS with ½% Carbon Loading 2,500 g:
Flame Retardant Additive (POSS): 38 g
Carbon Radical Trap Additive (1%): 12.5 g
Polymer: 979 g
Monomer: 1,445.5 g
Premix: 25 g Procedure:

Three glass Pyrex pans were obtained. The above formulations were mixed, one for each separate sample, in the pans. The pans were then placed in the autoclave for 6 days to allow the slurry to polymerize. Once taken out of the autoclave, the samples were visually analyzed to determine if the additive turned the material opaque. The samples were analyzed using DMA and DSC to determine how the mechanical properties were altered due to the additive.

TABLE 1

DMA results Methacryl POSS (1.5%)/Carbon (1%, ½%) and Acrylo POSS (1.5%)/Carbon (1%, ½%).

| Sample | Storage Modulus @ 25° C. | Tg (° C.) |
|---|---|---|
| Methacryl (1.5%)/Carbon (1%) | 1931 | 123.6 |
| Methacryl (1.5%)/Carbon (½%) | 1779 | 123.2 |
| Acrylo (1.5%)/Carbon (1%) | 1513 | 123.0 |
| Acrylo (1.5%)/Carbon (½%) | 1879 | 123.0 |

TABLE 2

DSC results for Methacryl POSS (1.5%)/Carbon (1%), Acrylo POSS (1.5%)/Carbon (1%), Methacryl POSS (1.5%)/Carbon (½%) and Acrylo POSS (1.5%)/Carbon (½%).

| Sample | Heating # | Tg (° C.) | Average (° C.) | Standard Deviation |
|---|---|---|---|---|
| Methacryl (1.5%) with Carbon (1%) A | 1 | 111.8 | 122.15 | 0.26 |
|  | 2 | 122.1 |  |  |
|  | 3 | 122.4 |  |  |
| Methacryl (1.5%) with Carbon (1%) B | 1 | 111.9 |  |  |
|  | 2 | 122.1 |  |  |
|  | 3 | 122.5 |  |  |
| Methacryl (1.5%) with Carbon (1%) C | 1 | 111.4 |  |  |
|  | 2 | 121.7 |  |  |
|  | 3 | 122.1 |  |  |
| Methacryl (1.5%) with Carbon (½%)A | 1 | 116.3 | 123.68 | 0.84 |
|  | 2 | 124.7 |  |  |
|  | 3 | 125.0 |  |  |
| Methacryl (1.5%) with Carbon (½%) B | 1 | 113.6 |  |  |
|  | 2 | 123.0 |  |  |
|  | 3 | 123.1 |  |  |
| Methacryl (1.5%) with Carbon (½%) C | 1 | 113.9 |  |  |
|  | 2 | 123.0 |  |  |
|  | 3 | 123.3 |  |  |
| Acrylo (1.5%) with Carbon (1%) A | 1 | 111.4 | 120.52 | 0.49 |
|  | 2 | 120.0 |  |  |
|  | 3 | 120.5 |  |  |
| Acrylo (1.5%) with Carbon (1%) B | 1 | 110.6 |  |  |
|  | 2 | 121.5 |  |  |
|  | 3 | 120.6 |  |  |

TABLE 2-continued

DSC results for Methacryl POSS (1.5%)/Carbon (1%), Acrylo POSS (1.5%)/Carbon (1%), Methacryl POSS (1.5%)/Carbon (½%) and Acrylo POSS (1.5%)/Carbon (½%).

| Sample | Heating # | Tg (° C.) | Average (° C.) | Standard Deviation |
|---|---|---|---|---|
| Acrylo (1.5%) with Carbon (1%) C | 1 | 110.8 | | |
| | 2 | 120.4 | | |
| | 3 | 120.1 | | |
| Acrylo (1.5%) with Carbon (½%) A | 1 | 117.5 | 125.22 | 0.22 |
| | 2 | 125.0 | | |
| | 3 | 125.6 | | |
| Acrylo (1.5%) with Carbon (½%) B | 1 | 118.0 | | |
| | 2 | 125.2 | | |
| | 3 | 125.4 | | |
| Acrylo (1.5%) with Carbon (½%) C | 1 | 117.5 | | |
| | 2 | 125.0 | | |
| | 3 | 125.1 | | |

Results/Conclusions:

All four samples were optically clear. All of the Methacryl and Acrylo samples were cut for ASTM D635 (10 samples for each) and post cured for 6 days. Because the Methacryl/carbon samples had better burn rates when tested via UL-94V they will be tested via ASTM D635.

Example 11: Experiment 9: Acrylo and Methacryl POSS (1.5%) With Secondary Carbon and Phosphorous Radical Trap The objective of this test was to determine if the flame resistant material will limit the alterations of the mechanical properties of the material, but also allow the material to prevent large fires. Flame retardant additives in thermoplastic sheets act as resistors of materials to ignite, and once ignited, to limit the spread of the flame. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

The combination in Experiment 8 including one secondary flame retardant (carbonated material), but it was not enough to pass UL-94V testing. Because of this a third additive will be tested. First, solubility tests were done in order to determine what level the phosphonated material is soluble in monomer.

The solubility tests confirmed the phosphonated material was soluble in monomer, up to 5%. For the next round of testing, the loading of the carbonated material will be decreased to ¼% and DOPO will range from 1-3% while keeping POSS loading levels at 1.5%.

Formulation for 2,500 g loading:
Flame Retardant Additive (POSS): 38 g
Carbon Radical Trap Additive (¼%): 6.25 g
DOPO (1%): 25 g
Polymer: 979 g
Monomer: 1,433 g
Premix: 25 g Formulation for 2,500 g loading:
Flame Retardant Additive (POSS): 38 g
Carbon Radical Trap Additive (¼%): 6.25 g
DOPO (3%): 75 g
Polymer: 979 g
Monomer: 1,433 g
Premix: 25 g Additive Information:

United Initiators provided the following samples (carbon radical trap):
CUROX CC-DC
Hybrid Plastics provided the following samples:
Acrylo POSS Cage Mixture
Methacryl POSS Cage Mixture
TCI America provided the following sample:
DOPO Procedure:

Three glass Pyrex pans were obtained. The above formulations were mixed, one for each separate sample, in the pans. Samples were not refrigerated. Samples were not degassed. The pans were placed in the autoclave for 9 days to allow the slurry to polymerize. Once taken out of the autoclave, the samples were visually analyzed to determine if the additive turned the material opaque or left it transparent. The samples were analyzed using DMA and DSC to determine how the mechanical properties were altered due to the additive.

TABLE 1

DMA results for Methacryl POSS (1.5%)/Carbon (¼%)/DOPO (1%), Acrylo POSS (1.5%)/Carbon (¼%)/DOPO (3%), Methacryl POSS (1.5%)/Carbon (¼%)/DOPO (1%), and Acrylo POSS (1.5%)/Carbon (¼%)/DOPO (3%).

| Sample | Storage Modulus @ 25° C. | Tg (° C.) |
|---|---|---|
| Methacryl (1.5%)/Carbon (¼%)/DOPO (1%) | 1815 | 122.8 |
| Methacryl (1.5%)/Carbon (¼%)/DOPO (3%) | 1719 | 119.2 |
| Acrylo (1.5%)/Carbon (¼%)/DOPO (1%) | 1205 | 119.8 |
| Acrylo (1.5%)/Carbon (¼%)/DOPO (3%) | 1312 | 117.5 |

TABLE 2

DSC results for Methacryl POSS (1.5%)/Carbon (¼%)/DOPO (3%), Acrylo POSS (1.5%)/Carbon (¼%)/DOPO (1%), Methacryl POSS (1.5%)/Carbon (¼%)/DOPO (3%), and Acrylo POSS (1.5%)/Carbon (¼%)/DOPO (1%).

| Sample | Heating # | Tg (° C.) | Average (° C.) | Standard Deviation |
|---|---|---|---|---|
| Methacryl (1.5%)/Carbon (¼%)/DOPO (1%) A | 1 | 112.2 | 118.33 | 0.23 |
| | 2 | 118.3 | | |
| | 3 | 118.6 | | |
| Methacryl (1.5%)/Carbon (¼%)/DOPO (1%) B | 1 | 113.6 | | |
| | 2 | 118.4 | | |
| | 3 | 118.6 | | |
| Methacryl (1.5%)/Carbon (¼%)/DOPO (1%) C | 1 | 111.4 | | |
| | 2 | 118.0 | | |
| | 3 | 118.1 | | |
| Methacryl (1.5%)/Carbon (¼%)/DOPO (3%) A | 1 | 107.8 | 111.02 | 0.23 |
| | 2 | 110.9 | | |
| | 3 | 111.0 | | |
| Methacryl (1.5%)/Carbon (¼%)/DOPO (3%) B | 1 | 112.1 | | |
| | 2 | 111.2 | | |
| | 3 | 111.4 | | |
| Methacryl (1.5%)/Carbon (¼%)/DOPO (3%) C | 1 | 115.1 | | |
| | 2 | 110.9 | | |
| | 3 | 110.7 | | |

TABLE 2-continued

DSC results for Methacryl POSS (1.5%)/Carbon (¼%)/DOPO (3%), Acrylo POSS (1.5%)/Carbon (¼%)/DOPO (1%), Methacryl POSS (1.5%)/Carbon (¼%)/DOPO (3%), and Acrylo POSS (1.5%)/Carbon (¼%)/DOPO (1%).

| Sample | Heating # | Tg (° C.) | Average (° C.) | Standard Deviation |
|---|---|---|---|---|
| Acrylo (1.5%)/ | 1 | 106.9 | 117.13 | 0.27 |
| Carbon (¼%)/ | 2 | 116.8 | | |
| DOPO (1%) A | 3 | 117.2 | | |
| Acrylo (1.5%)/ | 1 | 107.6 | | |
| Carbon (¼%)/ | 2 | 117.1 | | |
| DOPO (1%) B | 3 | 117.5 | | |
| Acrylo (1.5%)/ | 1 | 106.0 | | |
| Carbon (¼%)/ | 2 | 116.8 | | |
| DOPO (1%) C | 3 | 117.4 | | |
| Acrylo (1.5%)/ | 1 | 105.5 | 110.83 | 0.22 |
| Carbon (¼%)/ | 2 | 110.4 | | |
| DOPO (3%) A | 3 | 111.0 | | |
| Acrylo (1.5%)/ | 1 | 105.6 | | |
| Carbon (¼%)/ | 2 | 110.7 | | |
| DOPO (3%) B | 3 | 111.0 | | |
| Acrylo (1.5%)/ | 1 | 107.8 | | |
| Carbon (¼%)/ | 2 | 110.9 | | |
| DOPO (3%) C | 3 | 111.0 | | |

Results/Conclusions:

Not all of DOPO at 3% went into mixture . . . acrylic might have residual traces of DOPO. Samples all came out yellow. The DOPO material that did not dissolve fell to the bottom of the pan for the samples with 3% loading. We will be cutting and sending out formulation 2 samples for ASTM D635 testing for both Acrylo and Methacryl POSS after a 4-day final anneal. Samples with 3% DOPO were much more brittle while machining than those with 1% DOPO. Methacryl (1.5%)/Carbon (¼%)/DOPO (1%) improved ASTM D635 results significantly; therefore, samples were cut for ASTM D1929 testing as well. After a few FR tests, it appeared that the lesser amount of carbon material that was added, the better the FR results. Because of this, the carbon material was removed from the formulation.

Example 12: Experiment 10: Acrylo and Methacryl POSS (1.5%) With Secondary Phosphorous Radical Trap The objective of this test was to determine if the flame resistant material will limit the alterations of the mechanical properties of the material, but also allow the material to prevent large fires. Flame retardant additives in thermoplastic sheets act as resistors of materials to ignite, and once ignited, to limit the spread of the flame. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

The combination in Experiment 9 included two secondary flame retardants (carbonated and phosphonated material), but the FR results inferred that the lesser amount of carbon material, the better the ratings. The carbon material was removed from the formulation and only the phosphonated material was tested. To make up for removing the carbon material, the phosphonated loading levels were increased.

Formulation for 2,500 g loading:
Flame Retardant Additive (POSS): 38 g
DOPO (1%): 25 g
Polymer: 979 g
Monomer: 1,433 g
Premix: 25 g
Additive Information:
Hybrid Plastics provided the following samples:
Acrylo POSS Cage Mixture
Methacryl POSS Cage Mixture
TCI America provided the following sample:
DOPO
Procedure:

Three glass Pyrex pans were obtained. The above formulations were mixed, one for each separate sample, in the pans. Samples were not refrigerated. Samples were not degassed. The pans were placed in the autoclave for 9 days to allow the slurry to polymerize. Once taken out of the autoclave, the samples were visually analyzed to determine if the additive turned the material opaque or left it transparent. The samples were analyzed using DMA and DSC to determine how the mechanical properties were altered due to the additive.

TABLE 1

DMA results for Methacryl POSS (1%)/DOPO (1%), Acrylo POSS (1.5%)/DOPO (1%), Methacryl POSS (1.5%)/Carbon (¼%)/DOPO (1%), and Acrylo POSS (1.5%)/Carbon (¼%)/DOPO (3%).

| Sample | Storage Modulus @ 25° C. | Tg (° C.) |
|---|---|---|
| Methacryl (1.5%)/DOPO (1%) | 1714 | 125.6 |
| Acrylo (1.5%)/DOPO (1%) | 1783 | 130.1 |

TABLE 2

DSC results for Methacryl POSS (1.5%)/Carbon (¼%)/DOPO (3%), Acrylo POSS (1.5%)/Carbon (¼%)/DOPO (1%), Methacryl POSS (1.5%)/Carbon (¼%)/DOPO (3%), and Acrylo POSS (1.5%)/Carbon (¼%)/DOPO (1%).

| Sample | Heating # | Tg (° C.) | Average (° C.) | Standard Deviation |
|---|---|---|---|---|
| Methacryl (1.5%)/ | 1 | 117.1 | 117.4 | 0.177 |
| DOPO (1%) A | 2 | 117.1 | | |
| | 3 | 117.7 | | |
| Methacryl (1.5%)/ | 1 | 114.6 | | |
| DOPO (1%) B | 2 | 117.4 | | |
| | 3 | 117.4 | | |
| Methacryl (1.5%)/ | 1 | 114.9 | | |
| DOPO (1%) C | 2 | 117.3 | | |
| | 3 | 117.4 | | |
| Acrylo (1.5%)/ | 1 | 107.3 | 117.1 | 0.316 |
| DOPO (1%) A | 2 | 117.4 | | |
| | 3 | 117.2 | | |
| Acrylo (1.5%)/ | 1 | 106.9 | | |
| DOPO (1%) B | 2 | 116.8 | | |
| | 3 | 117.5 | | |
| Acrylo (1.5%)/ | 1 | 105.7 | | |
| DOPO (1%) C | 2 | 116.6 | | |
| | 3 | 117.1 | | |

Results/Conclusions:

Samples with DOPO were transparent but had a yellow color. It appears that the DOPO migrates to the top of the acrylic. Accordingly, cutting the panel results in a less yellow sample.

Example 13: Experiment 11: Methacryl POSS (1.5%) With ZrP, PC900, ARS11

The objective of this test was to determine if the flame resistant material will limit the alterations of the mechanical properties of the material, but also allow the material to prevent large fires. Flame retardant additives in thermoplastic sheets act as resistors of materials to ignite, and once ignited, to limit the spread of the flame. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations. Premix was used in this round of experiments because the premix's modulus was lower than expected in Experiment 4. Acrylo POSS (3%) was also tested with premix.

Reagents/Formulations:

After experiment 10, it was determined that DOPO added a yellow tint to the transparent acrylic. Because of this tint, experiments will need to be performed using different secondary phosphorous additives that do not contain aromatic rings. Phosphorus additives that have aromatic rings may be the cause the yellowing of the material.

Formulation for 2,500 g Loading, 3% Phosphorous Loading
- POSS (1.5%): 37.5 g
- Secondary Additive (3%): 75 g
- Polymer: 979 g
- Monomer: 1,383.5 g
- Premix: 25 g Zirconium Hydrogen Phosphate was the only additive experimented with at this loading level Formulation for 2,500 g Loading, 5% Phosphorous Loading
- POSS (1.5%): 37.5 g
- Secondary Additive (5%): 125 g
- Polymer: 979 g
- Monomer: 1,333.5 g
- Premix: 25 g ARS11 and PC 900 experimented with at this loading level Formulation for 2,500 g Loading, 10% Phosphorous Loading
- POSS (1.5%): 37.5 g
- Secondary Additive (10%): 250 g
- Polymer: 979 g
- Monomer: 1,208.5 g
- Premix: 25 g ARS11 and PC 900 experimented with at this loading level Additive Information:
Hybrid Plastics provided the following samples:
Methacryl POSS Cage Mixture
Inovia provided the following sample:
ARS11
Thor provided the following sample:
PC 90Sunshine Factory provided the following sample:
Zirconium Hydrogen Phosphate (ZrP)

Procedure:

Three glass Pyrex pans were obtained. The above formulations were mixed, one for each separate sample, in the pans. Samples were not refrigerated. Samples were not degassed. The pans were placed in the autoclave for 11 days to allow the slurry to polymerize. Once taken out of the autoclave, the samples were visually analyzed to determine if the additive turned the material opaque or left it transparent. The samples were analyzed using DMA and DSC to determine how the mechanical properties were altered due to the additive.

TABLE 1

DMA results for Methacryl POSS (1.5%)/ARS11 (5%), Methacryl POSS (1.5%)/ARS11 (10%), Methacryl POSS (1.5%)/PCO 900 (5%), Methacryl POSS (1.5%)/PCO 900 (10%), Methacryl POSS (1.5%)/ZrP (3%).

| Sample | Storage Modulus @ 25° C. | Tg (° C.) |
|---|---|---|
| Methacryl POSS (1.5%)/ARS11 (5%) | 1652 | 111.2 |
| Methacryl POSS (1.5%)/ARS11 (10%) | 1037 | — |

TABLE 2

DSC results for Methacryl POSS (1.5%)/ARS11 (5%), Methacryl POSS (1.5%)/ARS11 (10%), Methacryl POSS (1.5%)/PCO 900 (5%), Methacryl POSS (1.5%)/PCO 900 (10%), Methacryl POSS (1.5%)/ZrP (3%).

| Sample | Heating # | Tg (° C.) | Average (° C.) | Standard Deviation |
|---|---|---|---|---|
| Methacryl POSS (1.5%)/ARS11 (5%) A | 1 | 112.6 | 112.15 | 0.934 |
|  | 2 | 112.5 |  |  |
|  | 3 | 112.9 |  |  |
| Methacryl POSS (1.5%)/ARS11 (5%) B | 1 | 107.9 |  |  |
|  | 2 | 112.6 |  |  |
|  | 3 | 113.1 |  |  |
| Methacryl POSS (1.5%)/ARS11 (5%) C | 1 | 113.7 |  |  |
|  | 2 | 110.5 |  |  |
|  | 3 | 111.3 |  |  |
| Methacryl POSS (1.5%)/ARS11 (10%) A | 1 | 116.0 | 118.0 | 0.283 |
|  | 2 | 117.8 |  |  |
|  | 3 | 118.2 |  |  |
| Methacryl POSS (1.5%)/ARS11 (10%) B | 1 | 115.7 |  |  |
|  | 2 | 117.6 |  |  |
|  | 3 | 118.4 |  |  |
| Methacryl POSS (1.5%)/ARS11 (10%) C | 1 | — |  |  |
|  | 2 | 117.8 |  |  |
|  | 3 | 118.2 |  |  |

Results/Conclusions:

POSS (1.5%) and ARS11 (5%) were tested for ASTM D635 (HB test) and UL94 (V test) to determine if ARS11 adds sufficient FR capabilities.

Example 14: Experiment 12: Methacryl POSS (1.5%) ARS11, FCX 210, P1022, P0683, P0269 (Not Degassed)

The objective of this test was to determine if the flame resistant material will limit the alterations of the mechanical properties of the material, but also allow the material to prevent large fires. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

After experiment 11, the loading levels of ARS11 were decreased for two reasons. One being to limit the golden hue and the other to maintain, or limit the change in mechanicals. The samples at 5% and 10% loading had a strong gold tint and the modulus was a lot lower than we typically see. For these applications, a lower modulus is ok, but it would be better to not stray as far as we did.

Formulation for 2,500 g Loading, 1.5% Phosphorous Loading
POSS (1.5%): 37.5 g
Secondary Additive (1.5%): 37.5 g
Polymer: 979 g
Monomer: 1421 g
Premix: 25 g
ARS11, FCX 210, P1022, P0683 and P0269 were experimented with at this loading level Formulation for 2,500 g Loading, 3% Phosphorous Loading
POSS (1.5%): 37.5 g
Secondary Additive (3%): 75 g
Polymer: 979 g
Monomer: 1,383.5 g
Premix: 25 g
ARS11 was experimented with at this loading level
Additive Information:
Hybrid Plastics provided the following samples:
Methacryl POSS Cage Mixture
Inovia provided the following sample:
ARS11
TCI America provided the following samples:
P1022, P0683 and P0269
Taijin provided the following sample:
FCX 210
Procedure:

Three glass Pyrex pans were obtained. The above formulations were mixed, one for each separate sample, in the pans. Samples were not refrigerated. Samples were not degassed. The pans were placed in the autoclave for 3 days to allow the slurry to polymerize. Once taken out of the autoclave, the samples were visually analyzed to determine if the additive turned the material opaque or left it transparent. The samples were analyzed using DMA and DSC to determine how the mechanical properties were altered due to the additive.

TABLE 1

DMA results for Methacryl POSS (1.5%) with secondary phosphorous additives. These samples were not degassed, but were post cured.

| Sample | Storage Modulus @ 25° C. | Tg (° C.) |
|---|---|---|
| POSS 1.5% ARS11 1.5% | | |
| POSS 1.5% ARS11 3% | 1039 | 87.8 |
| POSS 1.5% P1022 3% | 1468 | 109.3 |
| POSS 1.5% P0269 3% | 1461 | 128.9 |
| POSS 1.5% P0683 3% | 1338 | 106.8 |

TABLE 2

DSC results for Methacryl POSS (1.5%)/ARS11 (5%), Methacryl POSS (1.5%)/ARS11 (10%), Methacryl POSS (1.5%)/PCO 900 (5%), Methacryl POSS (1.5%)/PCO 900 (10%), Methacryl POSS (1.5%)/ZrP (3%).

| Sample | Heating # | Tg (° C.) | Average (° C.) | Standard Deviation |
|---|---|---|---|---|
| POSS 1.5% ARS11 1.5% A | 1 | 113.4 | 120.6 | 0.216 |
| | 2 | 120.6 | | |
| | 3 | 121.0 | | |

TABLE 2-continued

DSC results for Methacryl POSS (1.5%)/ARS11 (5%), Methacryl POSS (1.5%)/ARS11 (10%), Methacryl POSS (1.5%)/PCO 900 (5%), Methacryl POSS (1.5%)/PCO 900 (10%), Methacryl POSS (1.5%)/ZrP (3%).

| Sample | Heating # | Tg (° C.) | Average (° C.) | Standard Deviation |
|---|---|---|---|---|
| POSS 1.5% ARS11 1.5% B | 1 | 116.4 | | |
| | 2 | 120.3 | | |
| | 3 | 120.5 | | |
| POSS 1.5% ARS11 1.5% C | 1 | 117.9 | | |
| | 2 | 120.7 | | |
| | 3 | 120.5 | | |
| POSS 1.5% P1022 3% A | 1 | NA | 103.0 | 0.274 |
| | 2 | NA | | |
| | 3 | NA | | |
| POSS 1.5% P1022 3% B | 1 | 95.8 | | |
| | 2 | 102.7 | | |
| | 3 | 103.1 | | |
| POSS 1.5% P1022 3% C | 1 | 96.9 | | |
| | 2 | 102.8 | | |
| | 3 | 103.4 | | |
| POSS 1.5% P0269 3% A | 1 | 116.0 | 116.1 | 3.15 |
| | 2 | 118.1 | | |
| | 3 | 118.5 | | |
| POSS 1.5% P0269 3% B | 1 | 116.4 | | |
| | 2 | 118.1 | | |
| | 3 | 118.6 | | |
| POSS 1.5% P0269 3% Degassed C | 1 | NA | | |
| | 2 | 111.6 | | |
| | 3 | 111.7 | | |
| POSS 1.5% P0683 3% Degassed A | 1 | 115.8 | 115.6 | 1.567 |
| | 2 | 112.1 | | |
| | 3 | 116.7 | | |
| POSS 1.5% P0683 3% Degassed B | 1 | 114.1 | | |
| | 2 | 116.1 | | |
| | 3 | 116.2 | | |
| POSS 1.5% P0683 3% Degassed | 1 | 114.8 | | |
| | 2 | 115.8 | | |
| | 3 | 116.4 | | |

Results/Conclusions:

The FCX 210 was opaque. ARS11 exhibited some desirable properties. P1022, P0683, P0269 exhibited some desirable properties. Because P0269 had bubbles, degassing may be required prior to being poured.

Example 15: Experiment 13: Methacryl POSS (1.5%) ARS11, FCX 210, P1022, P0683, P0269 (Degassed)

The objective of this test was to determine if the flame resistant material will limit the alterations of the mechanical properties of the material, but also allow the material to prevent large fires. Flame retardant additives in thermoplastic sheets act as resistors of materials to ignite, and once ignited, to limit the spread of the flame. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

After experiment 11, the loading levels of ARS11 were decreased for two reasons. One being to limit the golden hue and the other to maintain, or limit the change in mechanicals. The samples at 5% and 10% loading had a strong gold tint and the modulus was a lot lower than typical modulus.

Formulation for 2,500 g Loading, 1.5% Phosphorous Loading

POSS (1.5%): 37.5 g

Secondary Additive (1.5%): 37.5 g

Polymer: 979 g

Monomer: 1421 g

Premix: 25 g

ARS11, FCX 210, P1022, P0683 and P0269 were experimented with at this loading level Formulation for 2,500 g Loading, 3% Phosphorous Loading POSS (1.5%): 37.5 g Secondary Additive (3%): 75 g Polymer: 979 g Monomer: 1,383.5 g Premix: 25 g ARS11 was experimented with at this loading level Additive Information:

Hybrid Plastics provided the following samples:

Methacryl POSS Cage Mixture

Inovia provided the following sample:

ARS11

TCI America provided the following samples:

P1022, P0683 and P0269

Taijin provided the following sample:

FCX 210

Procedure:

Three glass Pyrex pans were obtained. The above formulations were mixed, one for each separate sample, in the pans. The samples were degassed. The pans were then placed in the autoclave for 3 days to allow the slurry to polymerize. Once taken out of the autoclave, the samples were visually analyzed to determine if the additive turned the material opaque. The samples were analyzed using DMA and DSC to determine how the mechanical properties were altered due to the additive.

TABLE 1

DMA results for Methacryl POSS (1.5%)/ARS11 (1.5%), Methacryl POSS (1.5%)/ARS11 (10%), Methacryl POSS (1.5%)/PCO 900 (5%), Methacryl POSS (1.5%)/PCO 900 (10%), Methacryl POSS (1.5%)/ZrP (3%).

| Sample | Storage Modulus @ 25° C. | Tg (° C.) |
|---|---|---|
| POSS 1.5% ARS11 1.5% Degassed | — | — |
| POSS 1.5% ARS11 3% Degassed | 975 | 92.9 & 118.4 |
| POSS 1.5% P1022 3% Degassed | 1550 | 118.6 |
| POSS 1.5% P0269 3% Degassed | 1929 | 124.2 |
| POSS 1.5% P0683 3% Degassed | — | — |
| POSS 1.5% P0683 1.5% P0269 1.5% Degassed | 1328 | 121.8 |
| POSS 1.5% ARS11 1.5% P0269 1.5% Degassed | NA | NA |
| POSS 1.5% ARS11 1.5% CUROX 1.5% Degassed | NA | NA |

TABLE 2

DSC results for Methacryl POSS (1.5%)/ARS11 (5%), Methacryl POSS (1.5%)/ARS11 (10%), Methacryl POSS (1.5%)/PCO 900 (5%), Methacryl POSS (1.5%)/PCO 900 (10%), Methacryl POSS (1.5%)/ZrP (3%).

| Sample | Heating # | Tg (° C.) | Average (° C.) | Standard Deviation |
|---|---|---|---|---|
| POSS 1.5% ARS11 1.5% Degassed A | 1 | 111.4 | 118.97 | 0.83 |
|  | 2 | 119.5 |  |  |
|  | 3 | 119.9 |  |  |
| POSS 1.5% ARS11 1.5% Degassed B | 1 | 106.1 |  |  |
|  | 2 | 117.5 |  |  |
|  | 3 | 118.5 |  |  |
| POSS 1.5% ARS11 1.5% Degassed C | 1 | 109.7 |  |  |
|  | 2 | 118.7 |  |  |
|  | 3 | 119.7 |  |  |
| POSS 1.5% ARS11 3% Degassed A | 1 | 113.2 | 116.75 | 0.76 |
|  | 2 | 115.9 |  |  |
|  | 3 | 116.4 |  |  |
| POSS 1.5% ARS11 3% Degassed B | 1 | 115.3 |  |  |
|  | 2 | 117.4 |  |  |
|  | 3 | 117.6 |  |  |
| POSS 1.5% ARS11 3% Degassed C | 1 | 113.0 |  |  |
|  | 2 | 115.9 |  |  |
|  | 3 | 116.1 |  |  |
| POSS 1.5% P1022 3% Degassed A | 1 | 113.9 | 112.15 | 0.89 |
|  | 2 | 112.3 |  |  |
|  | 3 | 112.6 |  |  |
| POSS 1.5% P1022 3% Degassed B | 1 | 110.7 |  |  |
|  | 2 | 112.6 |  |  |
|  | 3 | 113.1 |  |  |
| POSS 1.5% P1022 3% Degassed C | 1 | 106.4 |  |  |
|  | 2 | 110.3 |  |  |
|  | 3 | 112.0 |  |  |
| POSS 1.5% P0269 3% Degassed A | 1 | 106.5 | 114.03 | 1.48 |
|  | 2 | 115.8 |  |  |
|  | 3 | 116.4 |  |  |
| POSS 1.5% P0269 3% Degassed B | 1 | — |  |  |
|  | 2 | 112.7 |  |  |
|  | 3 | 113.3 |  |  |
| POSS 1.5% P0269 3% Degassed C | 1 | 113.2 |  |  |
|  | 2 | 112.8 |  |  |
|  | 3 | 113.2 |  |  |
| POSS 1.5% P0683 3% Degassed A | 1 | 101.3 | 107.68 | 1.19 |
|  | 2 | 105.5 |  |  |
|  | 3 | 107.6 |  |  |
| POSS 1.5% P0683 3% Degassed B | 1 | 100.9 |  |  |
|  | 2 | 109.0 |  |  |
|  | 3 | 109.1 |  |  |
| POSS 1.5% P0683 3% Degassed C | 1 | 101.8 |  |  |
|  | 2 | 107.4 |  |  |
|  | 3 | 107.5 |  |  |
| POSS 1.5% P0683 1.5% P0269 1.5% Degassed A | 1 | 110.2 | 112.25 | 0.38 |
|  | 2 | 111.9 |  |  |
|  | 3 | 112.6 |  |  |
| POSS 1.5% P0683 1.5% P0269 1.5% Degassed B | 1 | 106.9 |  |  |
|  | 2 | 111.6 |  |  |
|  | 3 | 112.6 |  |  |
| POSS 1.5% P0683 1.5% P0269 1.5% Degassed C | 1 | 107.3 |  |  |
|  | 2 | 112.3 |  |  |
|  | 3 | 112.5 |  |  |
| POSS 1.5% ARS11 1.5% CUROX 1.5% Degassed A | 1 | 102.6 | 112.47 | 1.74 |
|  | 2 | 110.1 |  |  |
|  | 3 | 112.1 |  |  |
| POSS 1.5% ARS11 1.5% CUROX 1.5% Degassed B | 1 | 108.0 |  |  |
|  | 2 | 111.2 |  |  |
|  | 3 | 114.6 |  |  |
| POSS 1.5% ARS11 1.5% CUROX 1.5% Degassed C | 1 | 106.9 |  |  |
|  | 2 | 111.9 |  |  |
|  | 3 | 114.9 |  |  |
| POSS 1.5% ARS11 1.5% P0269 1.5% Degassed A | 1 | — | 120.63 | 0.37 |
|  | 2 | 121.1 |  |  |
|  | 3 | 120.3 |  |  |
| POSS 1.5% ARS11 1.5% P0269 1.5% | 1 | 113.7 |  |  |
|  | 2 | 120.3 |  |  |

TABLE 2-continued

DSC results for Methacryl POSS (1.5%)/ARS11 (5%), Methacryl POSS (1.5%)/ARS11 (10%), Methacryl POSS (1.5%)/PCO 900 (5%), Methacryl POSS (1.5%)/PCO 900 (10%), Methacryl POSS (1.5%)/ZrP (3%).

| Sample | Heating # | Tg (° C.) | Average (° C.) | Standard Deviation |
|---|---|---|---|---|
| Degassed B | 3 | 121.0 | | |
| POSS 1.5% ARS11 | 1 | 113.0 | | |
| 1.5% P0269 1.5% | 2 | 120.2 | | |
| Degassed C | 3 | 120.9 | | |

Results/Conclusions:

The samples with ARS11 were tinted gold. The samples of P0269, P1022 and P0683 were all very transparent.

Example 16: Experiment 14: Methacryl POSS (1.5%) ARS11 (13% and 15%) (Degassed)

The objective of this test was to determine if the flame resistant material will limit the alterations of the mechanical properties of the material, but also allow the material to prevent large fires. Because the thermoplastic sheets act as a glass replacement, the first test determined if the additive keeps the sheet transparent, or leaves it opaque. Next, the transparent samples were analyzed using DMA and DSC methods to determine the extent of alteration of the mechanical properties caused by the additive. If the material's mechanical properties were unaltered, or have minimum alterations, the material was flame tested and reviewed based on fire code regulations.

Reagents/Formulations:

After experiment 13, the POSS/ARS11 samples were sent out for ASTM D635 and UL94V testing. The results were great, but could still use some improvement.

Formulation for 3,000 g Loading

POSS (1.5%): 45 g

Secondary Additive (13%): 390 g

Polymer: 979 g

Monomer: 1556 g

Premix: 30 g

Formulation for 3,000 g Loading

POSS (1.5%): 45 g

Secondary Additive (15%): 450 g

Polymer: 979 g

Monomer: 1496 g

Premix: 30 g

Additive Information:

Hybrid Plastics provided the following samples:

Methacryl POSS Cage Mixture

Inovia provided the following sample:

ARS11

Procedure:

Three glass Pyrex pans were obtained. The above formulations were mixed, one for each separate sample, in the pans. The samples were degassed. The pans were then placed in the autoclave for 3 days to allow the slurry to polymerize. Once taken out of the autoclave, the samples were visually analyzed to determine if the additive turned the material opaque. The samples were analyzed using DMA and DSC to determine how the mechanical properties were altered due to the additive.

Results/Conclusions:

The metal pans need mold release otherwise the acrylic takes off pan coating. POSS/ARS11 samples appeared to required longer than 3-day casting. 2-week casting material exhibited desirable results.

As required, detailed embodiments of the flame resistant material have been disclosed. However, it should be apparent to those skilled in the art that the disclosed embodiments are provided for illustration only and are merely exemplary of the material, which may be embodied in various forms. Therefore, specific structural and functional details disclosed herein are not to be interpreted as limiting, but merely as a basis for the claims and as a representative basis for teaching one skilled in the art to variously employ the material in virtually any appropriately detailed structure.

What is claimed is:

1. A transparent fire resistant material comprising:
   a first polymer, wherein the first polymer is acrylic, acrylic glass, poly(methyl methacrylate) (PMMA), acrylic resin, plastics, or combinations thereof;
   a nanostructured filler, wherein the nanostructured filler is polyhedral oligomeric silsesquioxane (POSS), wherein the polyhedral oligomeric silsesquioxane has a methacrylate or acrylate end group attached to each of the 8 corners of the silsesquioxane structure;
   at least one crosslinker;
   at least one UV inhibitor;
   at least one mold release component;
   at least one or more radical source;
   at least one polymer inhibitor, wherein the polymer inhibitor is hydroquinone;
   at least one polymerization initiator;
   at least one brominated additive; and
   at least one phosphorous based synergist, wherein the synergist is 9,10-Dihydro-9-oxa-10-phosphaphenanthrene 10 oxide (DOPO).

2. The fire resistant material of claim 1 wherein the weight percent of first polymer to the total composition ranges from 45-52% (w/w).

3. The fire resistant material of claim 1 wherein the weight percent of POSS to the total composition ranges from about 0.1% to about 5% (w/w).

4. The tire resistant material of claim 1 wherein the weight percent of crosslinker to the total composition ranges from about 0.5%-1.0% (w/w).

5. The fire resistant material of claim 1 wherein the weight percent of polymer inhibitors to the total composition ranges from 0.001%-0.2% (w/w).

6. The fire resistant material of claim 1 wherein the fire resistant material is incorporated into any of the following: wall cladding, glazing, glazing for skylights, windows, wall fixtures, wall decorations, projection screens, two sided projection screens, bullet resistant glass, bullet proof glass, aerospace applications, ballistic resistant materials, impact resistant materials, or blast mitigation materials.

7. The fire resistant material of claim 1 wherein the weight percent of polymerization initiators to the total composition ranges from 0.1-5% (w/w).

8. The fire resistant material of claim 1 wherein the polymer inhibitor is selected from the group consisting of hydroquinone, methyl ether of hydroquinone, and 2,4-Dimethyl 6-tert-butylphenol.

9. The fire resistant material of claim 1 wherein the polymer inhibitor is further selected from the group consisting of methyl ether of hydroquinone, and 2,4-Dimethyl-6-tert-butylphenol.

* * * * *